United States Patent [19]
Harlin et al.

[11] Patent Number: 6,090,893
[45] Date of Patent: *Jul. 18, 2000

[54] POLYETHYLENE COMPOSITION

[75] Inventors: Ali Harlin, Vantaa; Aimo Sahila, Kerava; Veli Kilpeläinen, Vuokatti; Anders Nymark, Porvoo, all of Finland

[73] Assignee: Borealis Polymers Oy, Porvoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/875,322

[22] PCT Filed: Dec. 8, 1995

[86] PCT No.: PCT/FI95/00669

§ 371 Date: Jun. 16, 1997

§ 102(e) Date: Jun. 16, 1997

[87] PCT Pub. No.: WO96/18677

PCT Pub. Date: Jun. 20, 1996

[30] Foreign Application Priority Data

Dec. 16, 1994 [FI] Finland ................ 945925

[51] Int. Cl.[7] .......................... C08L 23/00; C08F 255/02
[52] U.S. Cl. .............................. 525/240; 525/324
[58] Field of Search ................... 525/324, 240; 526/159, 64

[56] References Cited

U.S. PATENT DOCUMENTS

| | | | |
|---|---|---|---|
| 4,230,831 | 10/1980 | Sakurai et al. | 525/240 |
| 4,336,352 | 6/1982 | Sakurai et al. | 525/240 |
| 4,550,143 | 10/1985 | Tanaka et al. | 525/240 |
| 4,617,352 | 10/1986 | Page et al. | 525/240 |
| 4,786,688 | 11/1988 | Thiersault et al. | 525/240 |
| 4,835,219 | 5/1989 | Tajima et al. | 525/240 |
| 4,859,749 | 8/1989 | Franke | 526/124 |
| 5,338,589 | 8/1994 | Böhm et al. | 428/36.9 |
| 5,494,965 | 2/1996 | Harlin et al. | 525/240 |
| 5,587,247 | 12/1996 | Kubo et al. | 525/240 |

FOREIGN PATENT DOCUMENTS

| | | | |
|---|---|---|---|
| 2070470 | 6/1992 | Canada | C08L 23/06 |
| 0129312 | 12/1984 | European Pat. Off. | C08L 23/04 |
| 0134427 | 3/1985 | European Pat. Off. | C08L 23/00 |
| 0273284 | 6/1988 | European Pat. Off. | |
| 268963 | 6/1989 | Germany. | |
| 0125452 | 1/1978 | Japan. | |
| 0133136 | 8/1982 | Japan. | |
| 1043639 | 3/1986 | Japan | C08L 23/04 |
| 9313141 | 7/1993 | WIPO | C08F 4/654 |
| 9422948 | 10/1994 | WIPO | C08L 23/02 |

Primary Examiner—David W. Wu
Assistant Examiner—Tatyana Zalukaeva
Attorney, Agent, or Firm—Steinberg & Raskin, P.C.

[57] ABSTRACT

The invention relates to polyethylene compositions containing 85–99.5 weight % of component A, which is a linear (co)polymer of ethylene having a bimodal weight distribution, and 0.5–15 weight % of component B having a unimodal molecular weight distribution. Component A is 40–60% by weight of a low molecular weight component (A1) having a weight average molecular weight between 5,000 and 50,000 g/mol, and a molecular weight distribution Mw/Mn between 2.5 and 9 and 60–40% by weight of a high molecular weight component (A2) having a weight average molecular weight between 300,000 and 900,000 g/mol, and a molecular weight distribution M/w/Mn between 4.5 and 12. Component B is a linear ethylene polymer having a molecular weight between 150,000–600,000 g/mol and an average molecular weight which is higher than the average molecular weight of component (A1) but lower than the average molecular weight of component (A2) and a density controlled within the range of 910–960 kg/m³. Component B is produced separately from component A by using Ziegler-Natta or metallocene catalysts.

16 Claims, No Drawings

POLYETHYLENE COMPOSITION

BACKGROUND OF THE INVENTION

The invention concerns polyethylene compositions having improved physical properties. Particularly the invention concerns polyethylene compositions, which are prepared from several components and which are suitable for manufacturing tough pipe materials and cable isolation materials having good stress cracking resistance, film grades having good appearance and low gel content, and blown products such as bottles.

Generally the strength properties of polyethylene materials depend on molecular weight. The greater the molecular weight is the greater are elasticity, stiffness and creep properties. In products having very high molecular weight the processability properties are degraded in such degree that the manufacturing of end products becomes problematic.

One way to manufacture polyethylene grades more suitable to different applications is to form the polyethylene composition from several different components having different molecular weight distributions. Such method is disclosed in U.S. Pat. No. 4,336,352, in which the composition is formed from three different components prepared by a process comprising several stages, or in separate processes, in which the product thereof are melt mixed together to achieve the end product. According to the method the end product is formed from component (A) having a molecular weight between 1000–100,000, component (B) having a molecular weight between 100,000–1,000,000 and component (C) having a molecular weight between 400,000–6,000,000. The amount of component (C) in the end product is between 1–10 percent by weight. In other words, the idea of the method according this publication is that to the mixture of two components having different molecular weight is added a minor amount (1–10%) of a polyethylene having a very high molecular weight.

In EP-publication 129312 there is disclosed another similar polyethylene composition having three components, in which the product is formed from component (A) having a molecular weight between 50,000–500,000, component (C) having a molecular weight between 100,000–1,500,000 and component (B) having a molecular weight between 50,000–500,000 and being a homopolymer produced by a chromium catalyst. Components (A), (B) and (C) can be according to the publication manufactured as separate components or components (A) and (C) can together form a product prepared by a two-phase method, in which the weight ratio between components (A) and (A) is between 70:30–30:70. In the latter case the product can thus be considered a mixture formed from a unimodal product (B) and bimodal product (A/C).

A similar product formed from three components is disclosed also in U.S. Pat. No. 4,230,831. In this case the third component is low density polyethylene, which is produced by high pressure process. It has different, more branched structure compound compared to polyethylenes produced in low pressure process. In this way it is not possible to obtain good ESCR-values.

In EP-publication 517222 it has also been disclosed a polyethylene product formed from an unimodal component and a bimodal component, which have been melt mixed together. In this case the product has been formed from 50–80 percent by weight of very high density polyethylene having a very broad molecular weight distribution, and from 20–50 percent by weight of LLD polyethylene or LD polyethylene having a melt index $MFR_2$ between 0.5–2, and the product obtained is presented to be suitable for manufacturing pipes, sheets and films for low temperature conditions.

The addition of component having very high molecular weight, as disclosed in U.S. Pat. No. 4,336,352 decrease the homogenity of the product by causing gels and makes the end product more stiff and thereby the processing more difficult.

The addition of homopolymer to bimodal polymer, as suggested in EP-publication 129,312, has been found to impare the stress cracking resistance of the end product.

In bimodal products prepared by multiphase polymerization and containing low molecular weight polyethylene and high molecular weight polyethylene the processability can be essentially improved and molecular weight distribution can be controlled within a broad range. However, it has been found according to the invention that it is possible in certain way to improve the mixing of two phases having very different molecular weights and thereby the morphology and the processabily of the products and the optimization of the mechanical properties. When essential improvements in processability and mechanical properties are tried to achieve, the phases of bimodal product have to be very different. This requires very accurate control of the phases.

SUMMARY OF THE INVENTION

The invention is based on finding that the optimization of comonomer distribution in the molecular weight distribution area between the both main components of the bimodal product is important. In this area even a small amount of certain third component causes considerable improvements in the properties of the end product. Especially it has been found according to the invention that addition of comonomer to the middle of molecular weight distributions of the components of the bimodal composition affects essentially on certain properties. In addition, an addition made to a middle of the molecular weight area improves the miscibility of the bimodal product thereby increasing the homogenity of the end product.

Thus the invention concerns a polyethylene composition, which contains 85–99 percent by weight of a component (A) having a bimodal molecular weight distribution and a component (B) having an unimodal molecular weight distribution. Component (B) is a linear ethylene polymer having molecular weight between 150,000–600,000, a molecular weight distribution between 3.5–9.5, a melt index $MFR_{21}$ between 0.5–10 and a density controlled within the range of 910–960 kg/m$^3$, and the amount of component (B) calculated from the end product is between 1–15 percent by weight. The melt flow indices described herein have been determined at 190° and the units are expressed as "g/10 min". $MFR_2$, has been determined under a 21.6 kg load.

The polyethylene composition according to the invention is thus formed from two main components, the bimodal component of which has a bimodal molecular weight distribution. This component has the following general properties:

| | |
|---|---|
| density | 940–955 kg/m$^3$ |
| $M_W$ | 150,000–400,000 |
| $M_W/M_n$ | 15–35 |
| $MFR_2$ | 0.03–0.6 |

The bimodal component is formed of a which is a low molecular weight fraction having preferably a molecular weight of 5000–50,000, a molecular weight distribution $M_w/M_n$ of 2.5–9 and melt index $MFR_2$ between 10–1000 g/10 min and a density between 950–980 kg/m$^3$. Most preferably this component has relatively high density, preferably 950–980 kg/m$^3$ and high melt flow $MFR_2$, preferably 150–500. The proportion of the fraction from the whole bimodal component is preferaby 40–60%. The another fraction of the bimodal component comprises a fraction having a calculated molecular weight $M_w$ of 300,000–900,000 and a molecular weight distribution of 4.5–12. The proportion of this fraction of the whole bimodal component is preferaby 60–40%. The calculated molecular weight is achieved for example by calculating from the molecular weight distribution of the low mole mass fraction and the molecular weight distribution the bimodal weight product measured by gel permeability.

The bimodal component is prepared preferably by a two-step process, in which in the first polymerization step the low molecular weight fraction is formed and in the second step polymerization is continued in another reactor to prepare the bimodal product. According to the invention it is also possible to form the high molecular weight component in the first reactor and the low molecular weight component in the second reactor.

It is especially preferable to prepare the bimodal component by a two-phase process, in which the first step is formed of a loop reactor in which ethylene is polymerized in propane medium and in which the second step is formed of a gas-phase reactor. However, both phases can be slurry polymerizations or gas phase polymerizations.

The other main component in the polyethylene composition according to the invention is a linear ethylene polymer having an unimodal molecular weight distribution and having a molecular weight preferably between 150,000–600,000, a molecular weight distribution between 3.5–9.5 and a melt index $MFR_{21}$ between 0.5–10. The density of the component is controlled so that it is between 910–960 kg/m$^3$. According to the invention it has been found that the density of the unimodal component being higher than 950 kg/m$^3$ the stress cracking resistance of the end product becomes essentially lower.

Thus, this component can be in the vicinity of the upper limit of the density area also an ethylene homopolymer, whereby improvements especially in the homogenity and creep properties are achieved and thus the end products are suitable, among others, for the manufacturing of films.

According to the most preferable embodiment of the invention the unimodal component is however a linear ethylene copolymer, the density of which is controlled by adding in the polymerization as comonomer $C_4$–$C_8$ alphaolefins such amount that the density of the component is within the range of 910–950 kg/m$^3$, preferably within the range of 920–945 kg/m$^3$. According to the invention it has been found that already minor amounts of such copolymer component added to the described bimodal component optimize the comonomer distribution and molecular weight distribution of the mixture, whereby the stress cracking properties of the mixture improve considerably. Thus, according to the invention the amount of the copolymer component calculated from the end product is between 1–15 percent by weight, preferaby between 2–12 percent by weight.

The comonomer used in the formation of the copolymer can be any $C_4$—$C_4$ alphaolefin or mixture thereof. Thus the comonomer can be selected for example from the group of 1-butene, 1-hexene, 4-methyl-1-pentene, 1-octene or the mixtures thereof. The amount of the comonomer in the copolymer can be selected between 0.5–10 weight-%.

The unimodal component B can be prepared by any suitable method, for example by slurry polymerization or gas phase polymerization. As catalyst any kind of Ziegler-Natta type catalyst, chromium catalyst or metallocene catalyst can be used together with conventional cocatalysts.

The polyethylene composition according to the invention can be prepared also by a multi-phase polymerization, in which for example in the first step an unimodal component is formed in amount corresponding of 1–15 weight-% of the end product and the bimodal component is formed in the second and the third polymerization step.

If the bimodal component and the copolymer component is prepared separately, the mixing of them together is carried out preferably by melt-mixing in an extruder, which can be any model giving an efficient mixing.

Further the polyethylene composition according to the invention can be prepared also so that a part of the fraction included in the low molecular weight fraction is added separately into the mixture formed by the bimodal component and unimodal component. The mixing is carrried out preferaby in an extruder, where the bimodal component and the unimodal polymer component are added in the beginning and a part, for example 1–50 weight-% of the component of low molecular weight is added as a side feed of the extruder. In this way it can be improved the homogenity of the end product in the way described in Finnish patent application FI931343.

DETAILED DESCRIPTION OF THE INVENTION

The invention is described further by examples. The stress cracking resistance (ESCR) is measured with CTL (constant tensile load) test by using the strain of 5.5 MPa. In the method it is followed the advance of the crack in prenotched standard sample bar. The result is described as the time (h) required to the breaking of the test bar.

EXAMPLE 1

A bimodal polyethylene component A was prepared by a two-step process, in which the first step consisted of a loop polymerization and the second step consisted of a gas phase polymerization. The production rate of the loop reactor was 35–40 kg/h and the production rate of the gas phase reactor was the same. As a catalyst a Ziegler-Natta catalyst was used prepared according to Finnish patent application FI916192 by using Al-alkyl as cocatalyst. The catalyst was fed only into the loop reactor.

The polymerization conditions were the following:

| Loop reactor | |
| --- | --- |
| Reactor temperature | 95° C. |
| Reactor pressure | 65 bar |
| Ethylene feed rate | 35–40 kg/h |
| Hydrogen feed rate | 50–60 g/h |
| Medium (diluent) | propane |
| Gas phase reactor | |
| Reactor temperature | 75° C. |
| Reactor pressure | 20 bar |
| Ethylene feed rate | 50–60 kg/h |
| Hydrogen feed rate | 15–20 g/h |
| Comonomer feed rate | 2, 8 kg/h |

The high density (974 kg/m$^3$) polymer fraction manufactured in the loop reactor was introduced into the gas phase reactor, in which polymerization was continued for manufacturing a bimodal product. The ratio between fractions produced in the loop reactor and in the gas phase reactor were 51:49–52:48. The properties of the product are presented in Table 1A.

Copolymer components B1–B2 having different densities were prepared by using the same catalyst as in the case of component A in the gas phase reactor, where the reaction conditions were the following:

| | |
|---|---|
| Production rate | 10 kg/h |
| Reactor pressure | 18 bar |
| Reactor temperature | 90° C. |
| Hydrogen partial pressure | 0.7–0.8 bar |
| Ethylene partial pressure | 7.5 bar |
| Comonomer | butene |
| Butene partial pressure | 0.35–0.4 bar |

Component B3 was a commercial ethylene copolymer NCPE (Borealis N.V) manufactured by chromium catalyst and having a density of 952 kg/m$^3$.

The properties of components B1–B3 are disclosed in Table 1B.

TABLE 1A

| Fraction | Reactor split | MFR$_5$ | MFR$_{21}$ | FRR21/5 | Density kg/m$^3$ |
|---|---|---|---|---|---|
| A1 | 51:49 | 0, 42 | 9, 5 | 22, 6 | 948 |
| A2 | 52:48 | 0, 42 | 10 | 23, 8 | 948 |
| A3 | 51:49 | 0, 43 | 9, 1 | 21, 2 | 947, 9 |

TABLE 1B

| Fraction | Comomer content (%) | MFR$_{21}$ | M$_w$ × 1000 | M$_w$/M$_n$ | Density kg/m$^3$ |
|---|---|---|---|---|---|
| B1 | 8, 2 | 2 | 308 | 7, 2 | 910 |
| B2 | 2, 0 | 2, 5 | | | 933 |
| B3 | — | 2 | 256 | 12 | 952 |

Components A and B were melt-mixed together in an extruder (ZSK-30, Werner-Pfleiderer). The revolution speed of the screw was 200 rpm and the production rate of the extruder was 6 kg/h. The temperature of the melt was 210–200° C. As stabilization agent 2500 ppm of Irganox B225 was added.

The properties of the products are presented in the following Table C.

The results indicate that with the compositions according to the invention it could be further improve ESCR-values compared with the only bimodal compositions in comparative tests 1 and 2. In experiment 5 into the bimodal polyethylene was added a homopolymer, which had been prepared by using chromium catalyst and the density of which was relatively high, e.g. 952 kg/m$^3$. Also in this case the ESCR-value was essentially worse than the compositions according to the invention. The best stress cracking properties were achieved in experiment 5, in which a homopolymer was used.

EXAMPLE 2

According to Example 1 a bimodal polyethylene was prepared so that the polymer fraction produced in the loop reactor having a high density (975 kg/m$^3$) and a high melt flow (MFR$_2$=405) was introduced into a gas phase reactor in which the polymerization was continued for manufacturing bimodal product. 1-Butene was added into gas phase reactor as comonomer. The ratio between the components produced in the loop reactor and in the gas phase reactor was 50:50. The bimodal polyethylene obtained had the following properties:

| | |
|---|---|
| MFR$_5$ | 0.34 |
| MFR$_{21}$ | 9 |
| FFR$_{21/5}$ | 26.5 |
| M$_W$ | 281,000 |
| M$_W$/M$_n$ | 21, 3 |
| Density | 951.1 kg/m$^3$ |
| Comonomer content | about. 1.4% |

Likewise according to Example 1 it was prepared an ethylene-butene copolymer B4 having a density of 937 kg/m$^3$, MFR$_{21}$, of 4, a molecular weight M$_w$ of 237,000 and M$_w$/M$_n$ of 6.1. The amount of comonomer in the copolymer was 1.1 weight-%

Components A and B were melt-mixed in the extruder according to Example 1. The properties of the products are presented in the following Table 2.

TABLE 1C

| Experiment | Fractions | Composition | MFR$_5$ | MFR$_{21}$ | Density kg/m$^3$ | ESCR (h) CTL/5.5 MPA | ESCR Elongation mm/100/° |
|---|---|---|---|---|---|---|---|
| 1 | A1 | 100.0 | 0.42 | 9.5 | 948 | 400 | |
| 2 | A2 | 100:0 | 0.42 | 10 | 948 | 500 | |
| 3 | A3 + B1 | 95:5 | 0.37 | 8 | 947 | 980 | 5.4/5.7 |
| 4 | A3 + B2 | 95:5 | 0.32 | 6.8 | 948 | 850 | 3.5/3.0 |
| 5 | A3 + B3 | 95:5 | 0.35 | 8.2 | 950 | 270 | 2.7/2.7 |

TABLE 2

| Experiment | Fractions | Composition | Co-monomer content (%) | MFR$_5$ | MFR$_{21}$ | M$_w$ (×1000) | M$_w$/M$_n$ | Density kg/m$^3$ | ESCR (h) CTL/5.5 MPa |
|---|---|---|---|---|---|---|---|---|---|
| 6 | A4 | 100:0 | | 1.4 | 0.34 | 9 | 281 | 21.3 | 951.1 | 1125 |
| 7 | A4 + B4 | 98:2 | | 1.4 | | | 274 | 25.5 | | 1280 |
| 8 | A4 + B4 | 95:5 | | 1.4 | 0.34 | 8 | 274 | 27.1 | 950.5 | 1120 |
| 9 | A4 + B4 | 90:10 | | 1.3 | 0.35 | 6.8 | 277 | 27.1 | 950 | 2190 |

Due to greater melt flow index (MFR$_2$) of the polymer fraction prepared in the loop reactor the ESCR-values of the end products were at higher levels as in Example 1. In spite of that the results indicate that when adding medium density copolymer it was achieved an essential improvement in the ESCR-values of the end product the addition amount being 10 weight-%.

COMPARISON EXAMPLE 1

According to Example 1 it was manufactured bimodal polymer so that the polymer fraction produced in the loop reactor and having a high density (975 kg/m$^3$) and high melt flow index (MFR$_2$=450) was introduced into a gas phase reactor where the polymerization was continued for manufacturing a bimodal product. The ratio between the fractions produced in the loop reactor and in the gas phase reactor were 50:50. The bimodal product A5 obtained had the following properties:

| | |
|---|---|
| MFR$_5$ | 0.39 |
| MFR$_{21}$ | 10.4 |
| FRR21/5 | 26.7 |
| Density | 949 kg/m$^3$ |

An ethylene homopolymer B5 was prepared in the same way as component B4 in Example 2, but without comonomer addition. The properties of the product were as follows:

| | |
|---|---|
| MFR$_{21}$ | 4.0 |
| M$_w$ | 254,000 |
| M$_w$/M$_n$ | 8.5 |
| Density | 958 kg/m$^3$ |

Components A and B were melt-mixed in an extruder in various conditions. The properties of the products obtained are presented in the following Table 3.

TABLE 3

| Experiment | Fractions | Composition | MFR$_5$ | MFR$_{21}$ | M$_w$ (×1000) | M$_w$/M$_n$ | Density kg/m$^3$ | ESCR (h) CTL/5, 5 MPa |
|---|---|---|---|---|---|---|---|---|
| 11 | A5 | 100:0 | 0, 39 | 10, 4 | 253 | 19, 9 | 949 | 910 |
| 12 | A5 + B5 | 98:2 | 0, 37 | 9, 65 | | | 949 | 662 |
| 13 | A5 + B5 | 95:5 | 0, 33 | 7, 93 | | | 949 | 695 |
| 14 | A5 + B5 | 90:10 | 0, 33 | 7, 45 | 278 | 19, 9 | 950 | 377 |
| 15 | A5 + B5 | 85:15 | 0, 34 | 7, 56 | | | 950 | 142 |

The results clearly indicate that when adding homopolymer having a density above 950 kg/m$^3$ to the bimodal product the ESCR-properties do not improve, but actually worsen, the more the addition amount.

We claim:

1. A polyethylene composition comprising 85–99.5 weight-% of component A, which is a linear (co)polymer of ethylene having a bimodal molecular weight distribution, comprising:

40–60% by weight of a low molecular weight component (A1) having a weight average molecular weight between 5,000 and 50,000 g/mol, and a molecular weight distribution Mw/Mn between 2.5 and 9; and 60–40% by weight of a high molecular weight component (A2) having a weight average molecular weight between 300,000 and 900,000 g/mol, and a molecular weight distribution Mw/Mn between 4.5 and 12; and 0.5–15 weight-% of component B having a unimodal molecular weight distribution and a molecular weight between 150,000 and 600,000 g/mol, said component B having an average molecular weight which is higher than the average molecular weight of said component (A1) but lower than the average molecular weight of said component (A2), and a density controlled within the range of 910–960 kg/m$^3$, said component B being produced separately from said component A by using Ziegler-Natta or metallocene catalysts.

2. A polyethylene composition according to claim 1, wherein the melt flow index determined under a 21.6 kg load or MFR$_{21}$ of said component B is between 0.5 and 10 g/10 min.

3. A polyethylene composition according to claim 1, characterized in that said component B is a linear ethylene copolymer having a density controlled by adding in the polymerization as comonomer C$_4$–C$_8$ alphaolefins in such amount that the density of said component B is within the range of 910–950 kg/m$^3$.

4. A polyethylene composition according to claim 3, characterized in that said comonomer is selected from the group consisting of 1-butene, 1-hexene, 4-methyl-1-pentene, 1-octene and mixtures thereof.

5. A polyethylene composition according to claim 1, wherein said bimodal Component A is formed of a first subcomponent, having a molecular weight between 5,000–50,000, a molecular weight distribution M$_w$/M$_n$ between 2.5–9 and a melt flow index determined under a 2.6 kg load or MFR$_2$ between 10–1,000 g/10 min, and a second subcomponent having a calculated molecular weight $M_W$ between 300,000–900,000 and a molecular weight distribution between 4.5–12.

6. A polyethylene composition according to claim 5, characterized in that the melt flow index determined under a 2.16 kg load or $MFR_2$ of said first subcomponent is between 150–500 g/10 min, and the density is between 950–980 kg/m$^3$.

7. A polyethylene composition according to claim 1, characterized in that said component B comprises 0.5–10 weight-% of comonomer.

8. A polyethylene composition according to claim 1, characterized in that said components A and B are melt-mixed together.

9. A polyethylene composition according to claim 5, characterized in that said composition is prepared by adding 1–50 weight-% of said first subcomponent to the mixture of components A and B.

10. A polyethylene composition according to claim 9, characterized in that said composition is prepared by mixing together components A and B in an extruder and adding at least part of the component of said first subcomponent through a side feed to said extruder.

11. A polyethylene composition according to claim 1, characterized in that said polyethylene composition has the following properties:

| | |
|---|---|
| density | 930–960 kg/m$^3$ |
| $M_W$ | 120,000–400,000 |
| $M_W/M_n$ | 7–45 |
| $MFR_2$ | 0.02–1.0 |

12. A polyethylene composition according to claim 1, characterized in that component A is prepared by a loop-gas phase reactor combination with Ziegler-Natta catalyst.

13. A polyethylene composition according to claim 5, characterized in that said first subcomponent is prepared in a loop reactor by using propane as a medium.

14. A polyethylene composition according to claim 1, characterized in that components A and/or B are prepared by polymerizing ethylene in the presence of a catalyst selected from the group consisting of a Ziegler-Natta, chromium or metallocene catalyst.

15. The polymer composition of claim 1, wherein said component B is a linear ethylene polymer.

16. The polymer composition of claim 1, wherein said component B has a molecular weight distribution between 3.5 and 9.5.

* * * * *